Sept. 7, 1937.　　　　C. H. OSLUND　　　　2,092,469
VARIABLE SPEED TRANSMISSION
Filed Nov. 20, 1934　　　2 Sheets-Sheet 1
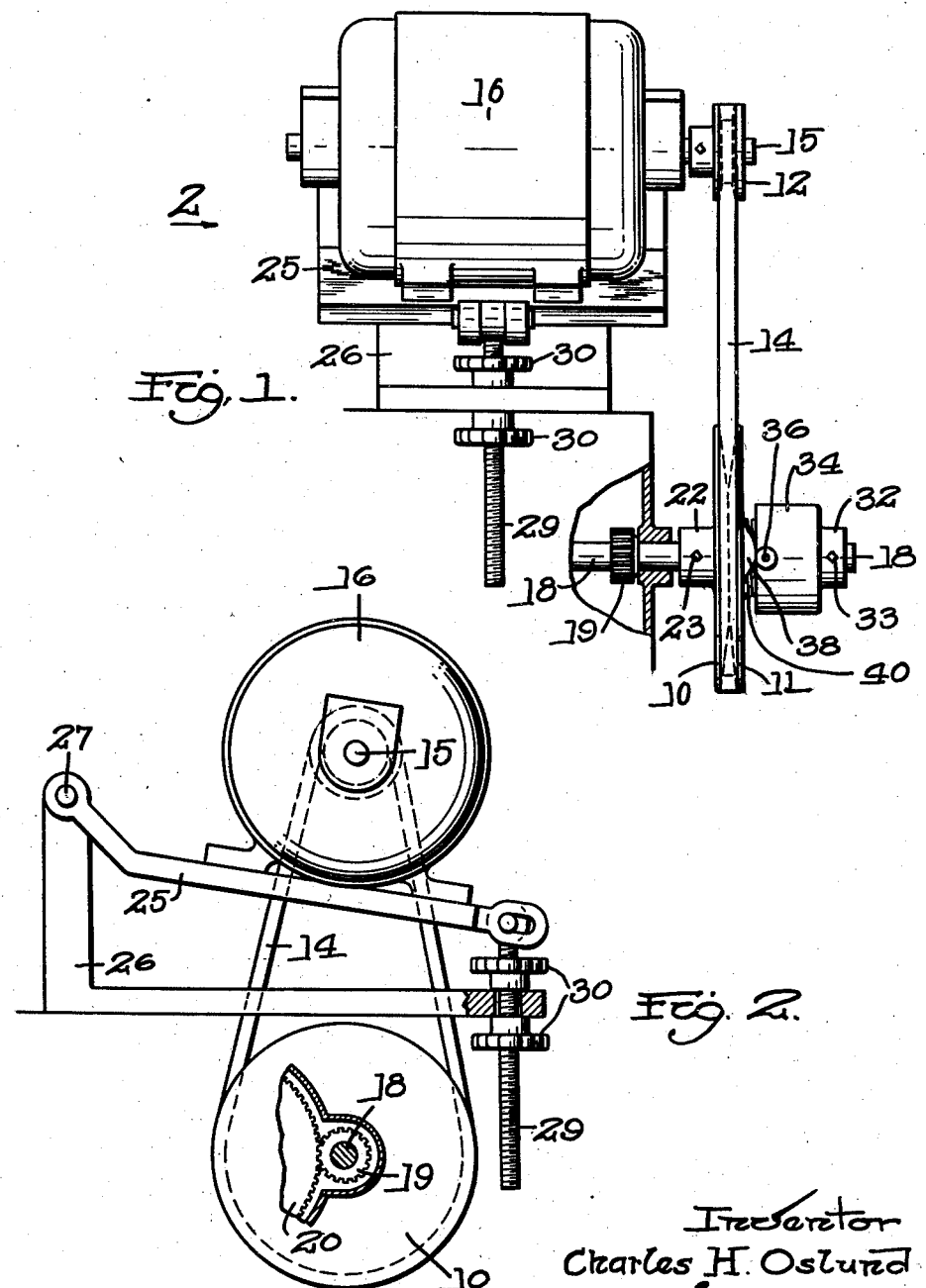

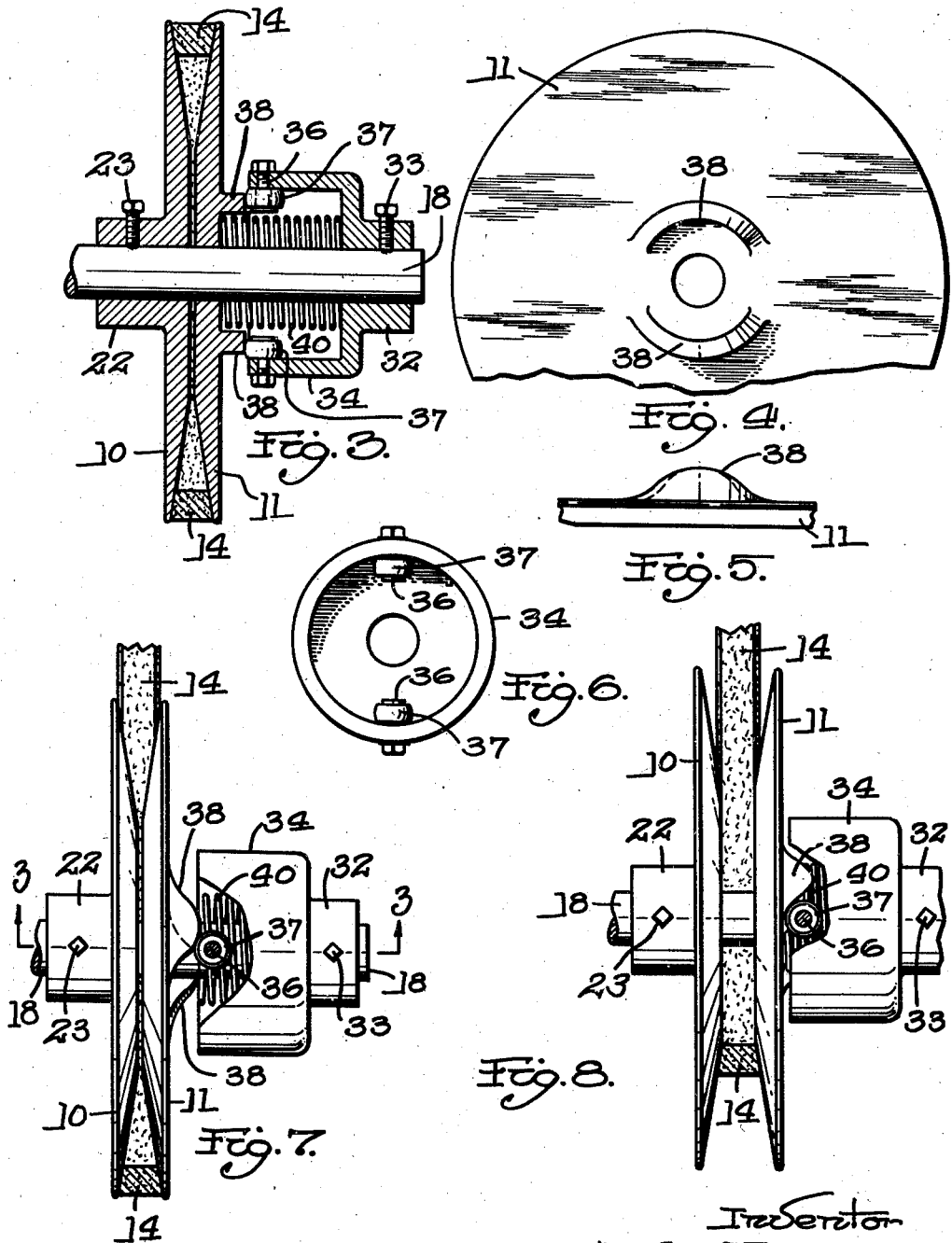

Patented Sept. 7, 1937

2,092,469

UNITED STATES PATENT OFFICE 2,092,469

VARIABLE SPEED TRANSMISSION

Charles H. Oslund, Worcester, Mass.

Application November 20, 1934, Serial No. 753,949

1 Claim. (Cl. 74—230.17)

This invention relates to variable speed transmissions, and more particularly to transmissions of the type having pulleys connected by an endless belt, one of the pulleys being of the expansible type so that its pitch diameter will vary as the distance between the pulley centers is adjusted.

In prior transmissions of this type it has been the practice to form the expansible pulley from a pair of opposed cones which are relatively movable in an axial direction, and to employ a spring to urge one cone toward the other and thus grip the belt between the cones. Such constructions are bulky and expensive. Moreover, the spring must be strong enough to ensure the required gripping action under all conditions of adjustment, and since the spring loading will vary with and depends solely upon the cone position regardless of the rate of power transmission, it necessarily follows that under many conditions of operation the pressure upon the belt and the resultant wear are very much greater than necessary.

It is accordingly one object of the invention to provide a variable speed transmission which will be simple, compact, and comparatively inexpensive to manufacture.

It is a further object of the invention to provide a variable speed transmission so constructed and arranged as to avoid excessive wear upon the driving belt.

It is a further object of the invention to provide a variable speed transmission so constructed and arranged that the belt will be gripped only hard enough to avoid slippage under the particular conditions prevailing at the time.

It is a further object of the invention to provide a variable speed transmission which will be capable of transmitting a predetermined maximum power irrespective of adjustments in the speed ratio.

With these and other objects in view, as will be apparent to those skilled in the art, the invention resides in the combination of parts set forth in the specification and covered by the claim appended hereto.

Referring to the drawings illustrating one embodiment of the invention and in which like reference numerals indicate like parts, Fig. 1 is an elevation of a variable speed transmission, certain parts being broken away for clearness of illustration;

Fig. 2 is an end elevation of the mechanism shown in Fig. 1;

Fig. 3 is a section on the line 3—3 of Fig. 7;

Fig. 4 is an elevation of the movable cone;

Fig. 5 is a detail showing the contour of the cam on the variable cone;

Fig. 6 is an end view of the flanged hub with the cam rollers mounted therein;

Fig. 7 is an elevation, partially broken away, showing the relationship of the various parts when adjusted for minimum speed; and Fig. 8 is a view similar to Fig. 7 showing the parts adjusted for maximum speed.

The embodiment illustrated comprises a pair of opposed cones 10 and 11 revoluble about a common axis and forming a pulley. A second pulley 12 is revoluble about an axis spaced from the first axis, and an endless belt 14, which is preferably of the V-type, connects the two pulleys. The pulley 12 is shown fixed to the shaft 15 of an electric motor 16, and the cones 10 and 11 are shown mounted on a shaft 18 parallel to the motor shaft. A pinion 19 is fixed to the shaft 18, and this pinion meshes with a gear 20 which may serve to actuate any desired apparatus.

In order that the speed of the driven shaft 18 may be controlled, I provide means for varying the pitch diameter of the pulley 10—11, this variation being effected automatically in response to an adjustment in the distance between the axes of the pulleys. For this purpose the two cones 10 and 11 are made relatively movable in an axial direction. In the preferred construction illustrated, the cone 10 is formed with an integral hub 22 which is fixed to the shaft 18 by means of a set-screw 23, and the cone 11 is arranged for axial sliding movement along the shaft.

The desired adjustment in the distance between the pulley axes is preferably effected by bodily moving the motor 16. For this purpose the motor is shown mounted on a base plate 25 which is hinged at one end to a frame 26 by means of a pin 27 parallel to the motor shaft. The other end of the base plate is connected to the frame by means of a threaded rod 29 which is held in a desired position of longitudinal adjustment by means of two manually operable nuts 30.

The various parts are so arranged that whatever may be the adjustment of the center distance between the shafts, and the resultant speed ratio, the driving tension of the belt 14 will serve to move the cone 11 toward the cone 10 and thus grip the belt between the cones. For this purpose, the cone 11 is made movable relative to the shaft 18 both axially and rotatably, and cooperating parts are provided which will move the cone axially in response to a relative rotative movement. In the preferred construction, this axial movement is brought about through the means of cooperating cam devices fixed to the shaft and to the movable cone respectively. The illustrated embodiment for effecting the desired result comprises a hub 32 fixed to the shaft 18 adjacent to the movable cone 11 by means of a set-screw 33. This hub is provided with an integral annular flange 34 which projects toward the movable cone in spaced relation with the shaft. Two pins 36 project substantially radially inward from the flange 34, and on these pins are mounted rollers 37 which engage cams 38 projecting from the movable cone. The pins 36, as well as the cams 38, are located 180 degrees apart and hence are symmetrically disposed about the axis of the shaft. Moreover, each cam 38 is preferably symmetrical with respect to an axial plane, as shown particularly in Fig. 5. As a result of this construction, the pulleys may be rotated in either direction, and an increase in the driving tension of the belt will always turn the movable cone relative to the shaft and thus effect an axial movement of this cone toward the fixed cone.

In the preferred construction illustrated, I have shown a comparatively light spring 40 to bias the movable cone toward the fixed cone. This spring is of the compression type, and surrounds the shaft 18 between the hub 32 and the movable cone. The spring 40 ensures a light contact between the movable cone and the belt even under stationary conditions and takes up any lost motion which would otherwise be present.

The operation of the invention will now be apparent from the above disclosure. When the motor is started it will rotate the pulley 12 and drive the belt 14. This will immediately turn the movable cone 11 about the shaft 18, and the cams 38 will engage the rollers 37, thus crowding the movable cone axially toward the fixed cone 10 and gripping the belt between the cones. The cones 10 and 11 and the shaft 18 will then rotate as a unit. An increase in the load imposed by the driven machine will cause the driving tension of the belt to increase, which will result in a firmer gripping of the belt. The pitch diameter of the pulley 10—11 can be varied by adjusting the center distance between the shafts through the medium of the nuts 30, and in this way the speed of the shaft 18 can be controlled as desired. Since the diameter of the driving pulley 12 is fixed, the belt will travel at a constant speed irrespective of adjustments in the speed ratio. This makes it possible to utilize the full power of the motor, whether the driven machine is operated at a slow speed or a high speed.

It will be seen that the belt will be gripped no tighter than is necessary to transmit the power imposed at the time by the driven machine. Hence the wear on the belt will be greatly reduced. The cam mechanism is enclosed and protected by the annular flange 34. The entire construction is simple, compact and inexpensive.

In the specification, the parts 10 and 11 are described as "cones". This term is intended to be given a broad interpretation, since it is obviously unnecessary that these parts be cones in the strictly mathematical sense.

Having thus described my invention, what I claim as new and desire to secure by Letters Patent is:

A variable speed transmission comprising a rotatable shaft, a pair of opposed cones mounted on the shaft and forming a pulley, one of said cones being movable relative to the shaft both axially and rotatably, an endless belt engaging the cones, a hub fixed to the shaft adjacent to the movable cone, an annular flange on the hub and projecting toward the movable cone, a pin projecting substantially radially inward from the flange, a roller on the pin, and a cam projecting from the movable cone into engagement with the roller, said cam and roller cooperating to move the movable cone axially toward the other cone whenever it is moved rotatably relative to the shaft under the influence of the driving tension of the belt, the flange serving as a protective enclosure for the cam and roller.

CHARLES H. OSLUND.